United States Patent [19]

Davis

[11] 4,368,716
[45] Jan. 18, 1983

[54] FUEL PROCESSOR APPARATUS FOR DIESEL POWERED VEHICLES

[75] Inventor: Leland L. Davis, Saline, Mich.

[73] Assignee: Davco, Inc., Ann Arbor, Mich.

[21] Appl. No.: 188,875

[22] Filed: Sep. 19, 1980

[51] Int. Cl.³ ............... F02M 31/00; B01D 23/00
[52] U.S. Cl. .................... 123/557; 210/184
[58] Field of Search .......... 123/557; 210/184, 186, 210/182, 185, 187; 165/52, 51

[56] References Cited

U.S. PATENT DOCUMENTS

| | | | |
|---|---|---|---|
| 1,623,074 | 4/1927 | Tartrais | 123/557 |
| 1,866,970 | 7/1932 | Garland | 210/184 |
| 2,070,189 | 2/1937 | Webster | 165/52 |
| 3,447,511 | 6/1969 | Beard | 123/557 |
| 4,091,782 | 5/1978 | Dunnam | 123/557 |

*Primary Examiner*—Ronald H. Lazarus
*Attorney, Agent, or Firm*—Harness, Dickey & Pierce

[57] ABSTRACT

A new fuel processor apparatus for diesel engines, particularly diesel engine powered vehicles, with the apparatus having no moving parts and no internal gaskets or connections to leak or deteriorate, and said apparatus being capable of removing water from the diesel fuel while promoting filterability and combustion efficiency of the fuel.

8 Claims, 5 Drawing Figures

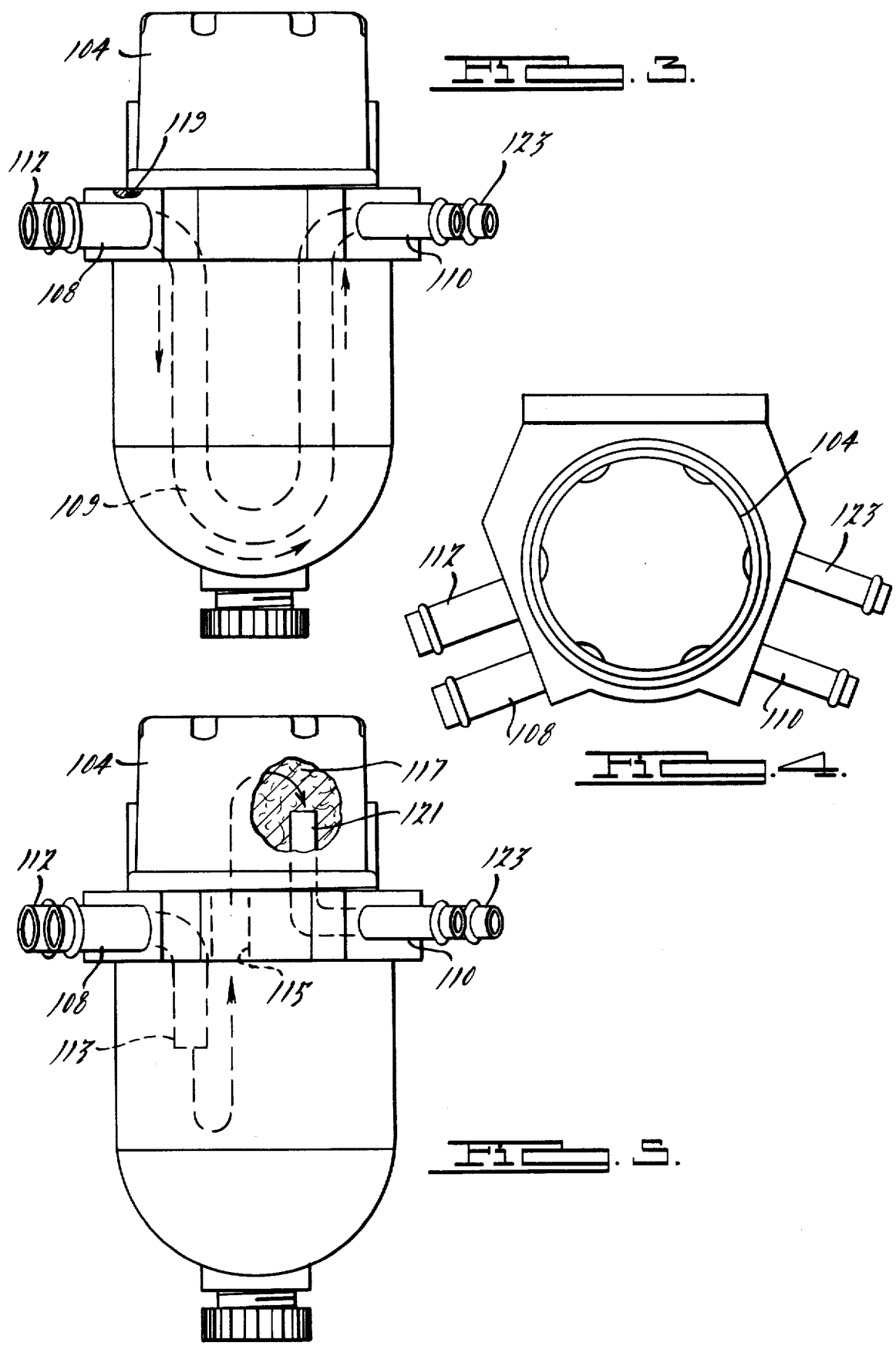

FUEL PROCESSOR APPARATUS FOR DIESEL POWERED VEHICLES

BACKGROUND OF THE INVENTION

This invention broadly relates to a new fuel processing apparatus for diesel engine powered trucks and automotive vehicles, as well as other diesel engine power installations.

The state of the art is indicated by the following cited references (U.S. Pat. Nos.): Dunman #4,091,782; Quinn #4,146,002; Gratzmuller #3,354,872; McMinn #3,396,512; McCabe #3,762,548; Campbell #3,768,730; Richard #3,913,543; Cheysson #3,925,204; Virgil #3,935,901; McQuerry #3,209,816; Rehm #3,962,999; Zabenski #4,015,567; Amano #4,027,639; Linder #4,044,742; Hawkins #4,072,138; and Richards #4,091,265.

In the past when diesel fuel was plentiful and relatively inexpensive there were significantly fewer problems with the quality of the diesel fuel because of the substantial competition between sellers of the fuel. Refineries, distributors, and retailers of the fuel were careful to keep water out of the fuel, and they usually did not pump out the heavy settlings from the bottom of the fuel storage tanks. In more recent times, with shortages of oil, the fuel suppliers can sell essentially all of their available oil with little difficulty. Additionally, fuel suppliers in the past have blended kerosene and other fuels with lower cloud and pour points to Diesel Fuel to facilitate cold weather flow and use. Fuel allocations due to government regulations and oil shortages have now made it almost impossible to continue this practice. The result has been a distinct tendency toward lesser quality fuel containing substantially more impurities such as water and particulate materials which are very disruptive to proper operation of a diesel engine.

Accordingly, a main object of this invention is to provide a new and improved fuel processor apparatus for diesel trucks and other diesel powered automotive vehicles to remove water from the diesel fuel, while at the same time providing for increased fuel economy.

Another object of the invention is to provide a new fuel processor apparatus which includes a unique built-in but removable fuel filter element (e.g., of either the spin-on or drop-in type).

Another object of the invention is to provide a new fuel processor apparatus which heats the fuel to promote filterability, combustion efficiency, water removal, and to reduce crystallization of fuel wax elements.

Another object of the invention is to provide a new fuel processor apparatus which removes water from the fuel to protect the fuel pump and fuel injection components and protects fuel filter elements to extend the filter operation life.

Another object of the invention is to provide a new fuel processor apparatus which when installed in the heater water line circuit, permits automatic operator control of heat to the fuel processor apparatus, in that the operator controls the passenger compartment heat and the fuel processor heat simultaneously.

Another objective of the invention is to be able to utilize the heat energy of crankcase or lubricating oil from the engine—either air or water cooled—to heat the diesel fuel to obtain the benefits of this invention.

Other objects, features and advantages of the present invention will become apparent from the subsequent description and the appended claims taken in conjunction with the accompanying drawings.

BRIEF DESCRIPTION OF THE DRAWINGS

FIG. 3 illustrates a front elevation view of the embodiment of FIG. 2.

FIG. 4 illustrates a cross-sectional view taken along the line 4—4 of FIG. 3.

FIG. 5 is a general schematic view illustrating the flow path for the diesel fuel in the embodiment of FIGS. 2-4.

DESCRIPTION OF PREFERRED EMBODIMENTS

Figures 1, 2:
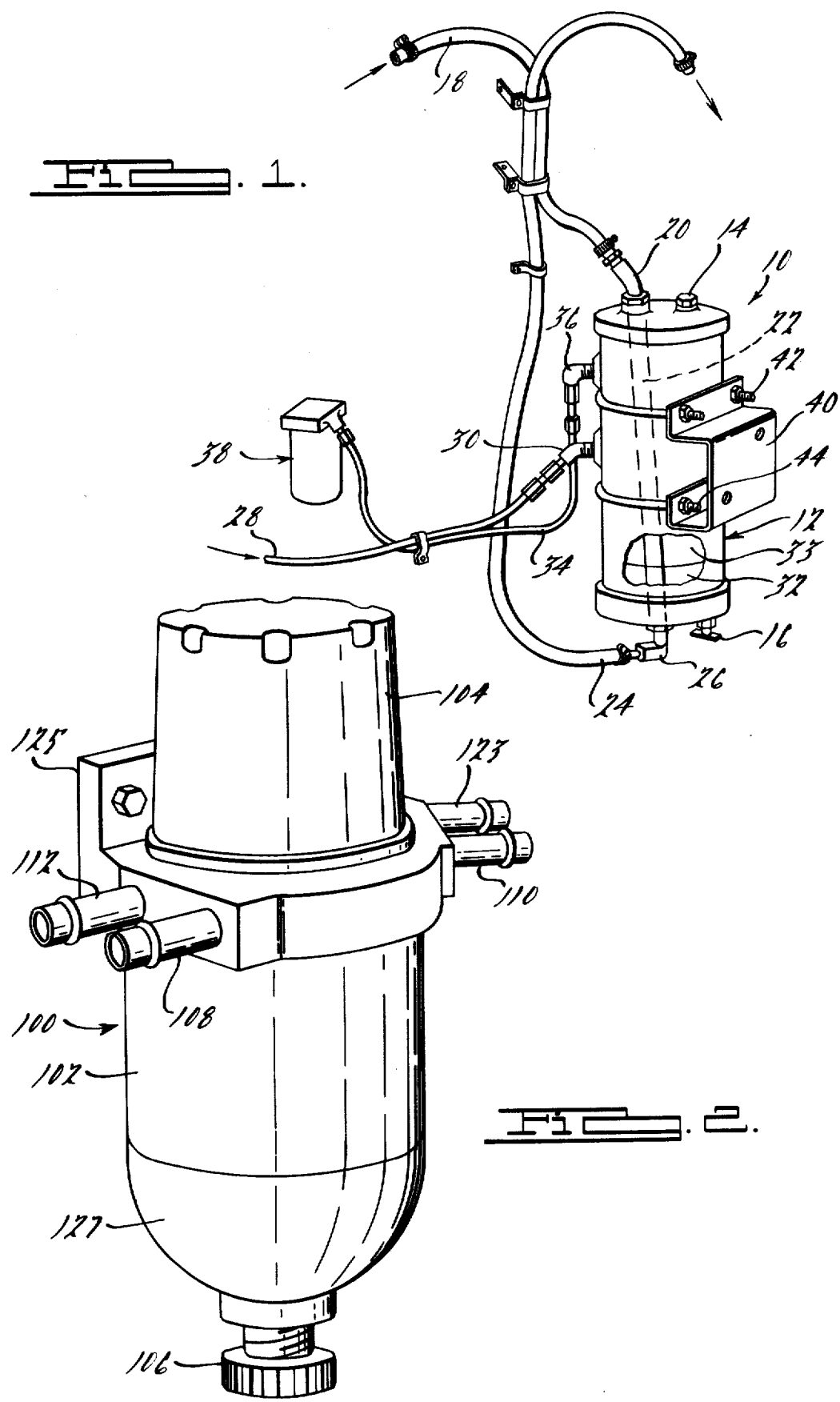
FIG. 1 of the drawings illustrates a typical installation of the fuel processor apparatus of this invention.
FIG. 2 illustrates the embodiment of the invention with a built-in fuel filter. (Two types—integral or spin-on)

FIG. 1 illustrates a typical installation of the fuel processor apparatus generally designated 10 in accordance with the invention. The apparatus 10 is preferably constructed in the form of a seamless extruded aluminum vessel 12 which has a vent or filler plug 14 at the top and a drain fitting 16 at the bottom of the vessel. Hot coolant liquid (e.g., from the heater return water line circuit or oil from engine) is introduced to the vessel 12 through an inlet line 18. The heated coolant liquid is introduced to the interior of the vessel 12 via the inlet fitting 20 and flows through the central portion of the vessel in straight-through fashion by means of flow-through conduit 22, from which it passes to the outlet conduit 24 which is connected to the vessel 12 by means of the fitting 26. The hot coolant liquid leaves the vessel 12, passes through the conduit 24 and is returned via a heater line to the water pump (not shown) of the vehicle. The construction of the fuel processor apparatus 12 and and interior conduit 22 is preferably of aluminum because of its excellent heat transfer quality and compatibility with the vehicle cooling system. However, other construction materials can of course be used.

Cold wet diesel fuel from the fuel tank of the truck or vehicle is introduced to the apparatus 10 via the fuel inlet line 28 and the inlet fitting 30 from which it passes into the interior of the vessel 12. The diesel fuel once passing thorugh the internal portion of the vessel 12 is heated by counter-action and contact with the hot coolant liquid passing through the conduit 22. Due to the heat exchange action which takes place within the vessel 12 and also due to the significant difference between the specific heat of fuel oil and the specific heat of water contained therein, the suspended water (as well as any ice crystals suspended in the fuel) are separated out of the fuel and settle to the bottom of vessel 12 in the form of collected water 32 beneath the diesel fuel 33.

The water-free heated fuel then passes out the outlet conduit 34 via the fitting 36, and then the water-free heated fuel is introduced to a primary fuel filter 38 from which it is transmitted to the diesel engine.

A bracket 40 and U-bolt clamping means 42, 44, can be used to suitably mount the fuel processor apparatus at any sturdy convenient location on the vehicle.

There now follows a description of the embodiment of the invention shown in FIGS. 2-5, wherein the fuel processor apparatus includes a built-in integral fuel filter. In the embodiment of FIGS. 2-5 the fuel processor apparatus 100 is constructed in the form of a generally elongated cylindrical vessel 102 which has an integral filter member 104 at the top thereof and a drain plug 106 at the bottom thereof. Hot coolant liquid (e.g., from the heater return water line circuit) is introduced to the vessel 102 through an inlet line 108 from which it assumes the flow path through the vessel 102 to pass through the interior of the vessel by means of flow through conduit 109, and subsequently it passes to the water outlet conduit 110.

Cold or unprocessed diesel fuel from the fuel of the truck or vehicle is introduced to the apparatus 100 via the fuel inlet line 112 from which it passes into the interior of the vessel 102 by means of the conduit 113. The diesel fuel once passing through the internal portion of the vessel 102 is heated by counter-action and contact with the hot coolant liquid passing through the conduit 109. Due to the heat exchange action which takes place within the vessel 102 and also due to the significant difference between the specific heat of the fuel oil and the specific heat of the water contained therein, the suspended water, (as well as any ice crystals suspended in the fuel) are separated out of the fuel and settle to the bottom of the vessel 102 in a fashion similar to the operation of the FIG. 1 embodiment. The water-free heated fuel then passes out of the vessel 102 by means of the conduit or passage way 115 which introduces the fuel to the filter element 104, which includes a filtering material designated 117. The filtration material 117 operates to remove particulate material which resides in the diesel fuel.

The filter element 104 is a spin-on type of filter (or it could be a drop-in type filter) which is integrally connected to the apparatus 100 by means of a threaded connection 119. After the fuel has passed through the filtration material 117 the fuel exits from the filter via the conduit 121 and the fuel outlet conduit 123.

Additional features which are present in the embodiment designated 100, and particularly as shown in FIG. 2 are that the bottom of the vessel 102 may suitably include a transparent or see-through section designated 127 so that the collected water can be observed at the bottom of the vessel 102, thus facilitating removal of the water at periodic intervals. In addition, the lower length of the vessel 102 can be extended to make the overall fuel processor apparatus 100 of variable capacity depending upon the fuel requirements of the engine. A bracket means 125 can be used to suitably mount the fuel processor apparatus 100 at any sturdy convenient location on the vehicle.

The fuel processor apparatus of the invention functions in a manner related more closely to a chemical or petro-chemical device rather than a mechanical device. Certain highly advantageous considerations in accordance with the invention are as follows:

(1) The specific heat of fuel oil is approximately one third that of water. (2) The specific gravity of fuel oil is approximately 80% of the specific gravity of water. (3) The coefficient of expansion differential between diesel fuel and water is so significantly different that when the fuel is heated, the twin phenomena of specific heat and coefficient of expansion causes water entrapped or suspended in the fuel to quickly separate and fall out—where it can be collected and drained away. (4) The surface tension of free water—once it is separated in the device of the invention—prevents water in the fuel processor from becoming resuspended in the fuel. (5) Bacterial growth occurs in fuels but essentially only when water is present. Bacteria are a major threat to fuel filters due to their clogging action. Bacteria have demonstrated their ability to "wick" themselves up around fuel filters to permit their propagation on filter elements—thus rapidly clogging filters and causing engines and vehicle downtime and repair costs. Water in the fuel can also result in the formation of sulfuric acid which is harmful to engine accessories and operation. The device of the present invention through its action of removing water from the fuel acts to alleviate the problems of bacteria formation and sulfuric acid formation. (6) The fuel processor device of this invention effectively dewaters fuel, removing over 99.7% of all suspended water—including that formed through the deterioration of the hydrocarbon molecule, and oxidation by the free oxygen in the atmosphere. (7) Ice crystals form in fuel during cold weather [$-32°$ or lower] when molecules of water are present in fuels. The specific gravity of ice is very near that of fuel and permits ice to flow with the fuel to the filters. When this occurs, ice crystals can completely clog or seriously reduce fuel flow to the engine. The specific heat value for ice is 0.505 [or approximately ½ that of water]; ice crystals melt quickly in the fuel processor apparatus of this invention. The newly formed liquid water, being much colder than the fuel and consequently much heavier, immediately falls to the bottom of the fuel processor where it can be drained away. (8) Prevention of paraffin formations when ambient temperatures may drop below the cloud point of the fuel is accomplished by the fuel processor of the invention. In particular the greater weight of the molecules of parrafins and naphthenes are maintained in their liquid state. By enabling these heavy fuel elements to be used during cold weather, fuel economy is realized and the costs of adding chemicals or lighter grade fuels to dissolve the paraffin is eliminated. (9) Fuel oil, especially diesel fuel, shrinks when cooled. Fuel injectors operate by displacing a specific volume, therefore the heat potential of diesel fuel on a volume basis changes according to temperature. The fuel processor of this invention aids in improving fuel economy in diesel powered equipment in cold weather by restoring the diesel fuel molecule to a temperature consistent with factory engine calibrations and settings.

While it will be apparent that the preferred embodiments of the invention disclosed are well calculated to fulfill the objects above stated, it will be apparent that the invention will be susceptible to modification, variation and change without departing from the proper scope or fair meaning of the subjoined claims.

What is claimed is:

1. A fuel processor means for use with diesel engines on diesel trucks, automobiles, and the like, and whereby said fuel processor is operative to preheat the diesel fuel and to separate out water-impurities from the diesel fuel, comprising, a vertically oriented elongated tubular vessel means for separating water out of the fuel, inlet conduit means near the top of said vessel to introduce hot engine coolant liquid to the vessel, another conduit means passing through a central portion of said vessel for transmitting the hot coolant liquid therethrough, outlet conduit means for recirculating the coolant liquid back through the engine cooling system, a second inlet conduit means for introducing fuel to the interior of the vessel near the midpoint thereof for flow therethrough and such that this inlet is above the level of water-impurities being collected in the vessel, a second outlet conduit means for the fuel located near the top of the vessel for transmitting the water-free fuel to the engine, drain means at the bottom of the vessel for draining out water-impurities which collect therein, and means near the top of the vessel for venting the vessel when desired.

2. The invention of claim 1 wherein, said apparatus includes an integral filter means built-in with the vessel and operative to perform a filtering operation on the fuel during its passage through the apparatus.

3. A fuel processor means for use with diesel engines on diesel trucks, automobiles, and the like, and whereby said fuel processor means is operative to preheat the diesel fuel and to separate out water-impurities from the diesel fuel, comprising, a vertically oriented tubular vessel of generally seamless construction means operative for separating water out of the fuel, inlet conduit means near the top of said vessel to introduce hot engine coolant liquid, another conduit means passing through a central portion of said vessel for transmitting the hot coolant liquid therethrough, outlet conduit means near the bottom of said vessel for recirculating the coolant liquid back through the engine cooling system, a second inlet conduit means for introducing fuel to the interior of the vessel near the midpoint thereof for flow therethrough and such that this inlet is above the level of water-impurities being collected in the vessel, a second outlet conduit means for the fuel near the top of the vessel for transmitting the water-free fuel to the engine, and drain means at the bottom of the vessel for draining out water-impurities which collect therein.

4. The invention of claim 3 wherein, said apparatus is free of moving parts and has no internal gaskets to leak or deteriorate.

5. The invention of claim 3 further characterized as including:

means near the top of the vessel for venting the vessel when desired.

6. A fuel processor means for use with diesel engines on diesel trucks, automobiles, and the like, and whereby said fuel processor means is operative to preheat the diesel fuel and to separate out water-impurities from the diesel fuel, comprising, a vertically oriented tubular vessel of generally seamless construction means operative for separating water out of the fuel, inlet conduit means to introduce hot liquid from the engine, another conduit means passing through a central portion of said vessel for transmitting the hot liquid therethrough, outlet conduit means for recirculating the hot liquid back through the engine system, a second inlet conduit means for introducing fuel to the interior of the vessel near the midpoint thereof for flow therethrough and such that this inlet is above the level of water-impurities being collected in the vessel, a second outlet conduit means for the fuel near the top of the vessel for transmitting the water-free fuel to the engine, drain means at the bottom of the vessel for draining out water-impurities which collect therein, and vent means near the top of the vessel for venting the vessel when desired.

7. The apparatus of claim 1 wherein, said apparatus is free of moving parts and has no internal gaskets to leak or deteriorate.

8. A fuel processor means with an integral filter element for use with diesel engines on diesel trucks, automobiles, and the like, and whereby said fuel processor means is operative to preheat the diesel fuel and to separate out water-impurities from the diesel fuel, comprising, a vertically oriented elongated tubular vessel means for separating water out of the fuel, a filter element engaged to the top of said vessel means and being of integral construction therewith, inlet conduit means to introduce hot engine coolant liquid to the vessel, another conduit means passing through a central portion of said vessel for transmitting the hot coolant liquid therethrough, outlet conduit means for recirculating the coolant liquid back through the engine cooling system, a second inlet conduit means for introducing fuel to the interior of the vessel near the midpoint thereof for flow therethrough, another interior conduit means for transmitting the water-free fuel upwardly for passage through the filter element, a second outlet conduit means for removing the fuel from the filter element and transmitting the fuel to the engine, and drain means at the bottom of the vessel for draining out water-impurities which collect therein.

* * * * *